US009676369B2

(12) United States Patent
Kaminaga et al.

(10) Patent No.: US 9,676,369 B2
(45) Date of Patent: Jun. 13, 2017

(54) VEHICLE WIPER DEVICE

(71) Applicant: Fuji Jukogyo Kabushiki Kaisha, Tokyo (JP)

(72) Inventors: Kazuhiro Kaminaga, Tokyo (JP); Satoru Iwata, Tokyo (JP); Toshihiko Dejima, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/852,527

(22) Filed: Sep. 12, 2015

(65) Prior Publication Data

US 2016/0090067 A1 Mar. 31, 2016

(30) Foreign Application Priority Data

Sep. 30, 2014 (JP) .................. 2014-199921

(51) Int. Cl.
B60S 1/08 (2006.01)
B60S 1/48 (2006.01)
B60S 1/52 (2006.01)

(52) U.S. Cl.
CPC ............ B60S 1/481 (2013.01); B60S 1/0814 (2013.01); B60S 1/0896 (2013.01); B60S 1/482 (2013.01); B60S 1/485 (2013.01); B60S 1/486 (2013.01); B60S 1/08 (2013.01); B60S 1/0844 (2013.01); B60S 1/524 (2013.01)

(58) Field of Classification Search
CPC ........ B60S 1/28; B60S 1/0807; B60S 1/0818; B60S 1/0844; B60S 1/0896; B60S 1/482; B60S 1/486; B60S 1/08; B60S 1/524; B60S 1/485; B60S 1/0814

USPC ............ 15/250.12, 250.04; 318/DIG. 2, 443, 318/444, 446, 483, 470
See application file for complete search history.

(56) References Cited

U.S. PATENT DOCUMENTS 4,614,903 A * 9/1986 Betsch .................. B60S 1/0807
15/DIG. 15
4,720,664 A * 1/1988 Iwamoto ................. B60S 1/482
15/250.17
5,506,483 A * 4/1996 McCann .................. B60S 1/08
318/443

(Continued)

FOREIGN PATENT DOCUMENTS

JP H 05-097017 A 4/1993
JP 2005-206032 A 8/2005

(Continued)

Primary Examiner — Gary Graham
(74) Attorney, Agent, or Firm — McGinn IP Law Group, PLLC

(57) ABSTRACT

A vehicle wiper device includes: a first blade having an operating range that includes an upper mid region of a vehicle windshield; a second blade having an operating range that includes a lower region of the operating range of the first blade; a blade driving unit that causes each blade to reciprocate; and a controller that controls operation of the blade driving unit. When a tip end of the second blade moves in a special control region that is oriented toward a specific region preliminarily specified in the upper mid region, the controller controls the blade driving unit such that a moving speed of the second blade is lower than a moving speed of the second blade when moving in another region.

8 Claims, 5 Drawing Sheets

(56) References Cited

U.S. PATENT DOCUMENTS

2008/0127441 A1* 6/2008 Inoue ..................... B60S 1/522
15/250.04

FOREIGN PATENT DOCUMENTS

| JP | 2008-168808 A | 7/2008 |
| JP | 2012-224231 A | 11/2012 |

* cited by examiner

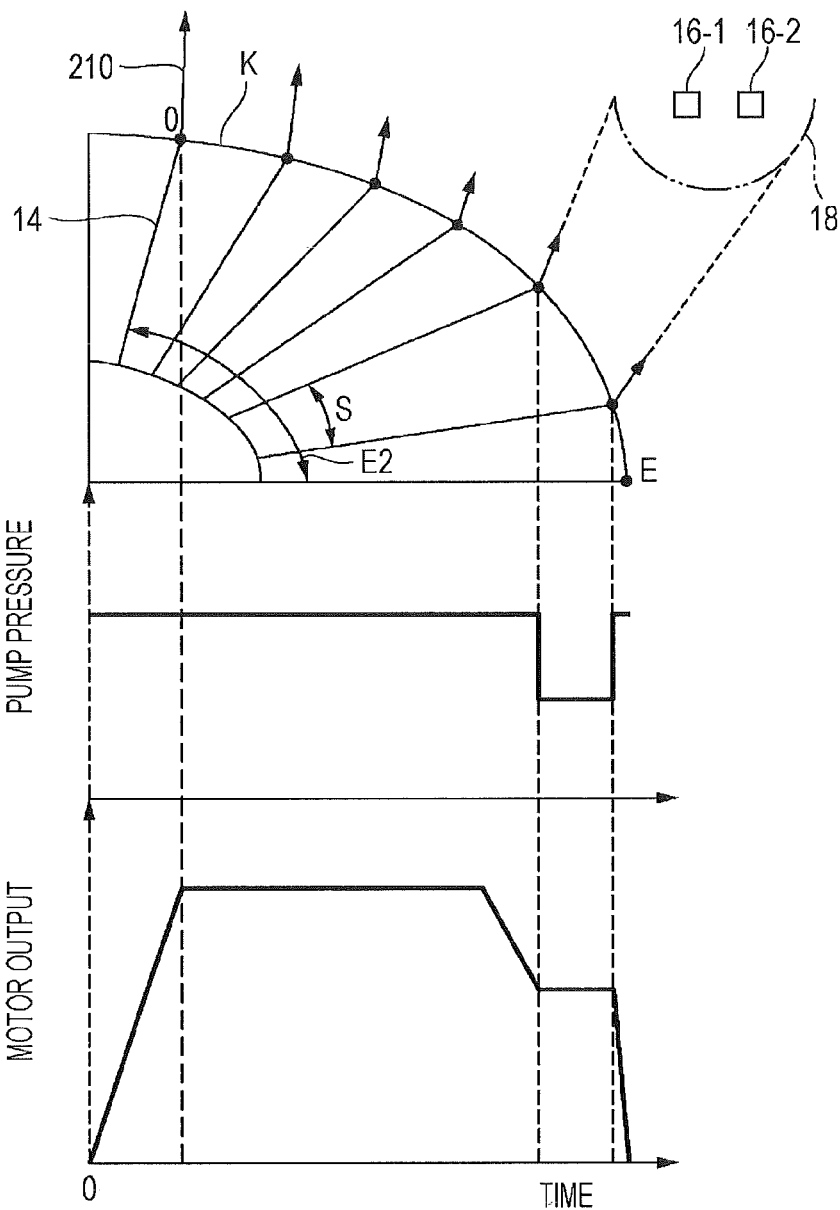

FIG. 5C

VEHICLE WIPER DEVICE

CROSS-REFERENCE TO RELATED APPLICATIONS

The present application claims priority from Japanese Patent Application No. 2014-199921 filed on Sep. 30, 2014, the entire contents of which are hereby incorporated by reference.

BACKGROUND

1. Technical Field

The present invention relates to vehicle wiper devices. In particular, the present invention relates to a vehicle wiper device equipped with a blade having a cleaning-liquid ejecting function.

2. Related Art

A vehicle wiper device is used as a device that cleans the surface of a vehicle windshield by wiping off rainwater and dirt therefrom. The vehicle wiper device is provided with a blade at a moving end of a pivot arm and reciprocates this blade on the surface of the windshield so as to wipe and clean the windshield.

Furthermore, in order to make the wiping-cleaning function more effective, a mechanism that feeds and ejects a cleaning liquid onto the surface of the windshield is also provided. In recent years, a configuration that ejects the cleaning liquid directly from the blade is used so as to eject the cleaning liquid to a more appropriate position or region of the windshield.

For instance, Japanese Unexamined Patent Application Publication No. 05-97017 discloses a wiper blade having a structure that sprays the cleaning liquid toward the glass surface. According to this technique, a packing member normally provided to blade rubber serving as the blade body has a cleaning-liquid feed passage. Thus, it is not necessary to provide an additional tube or spray nozzle, thereby achieving a simplified structure as well as a facilitated manufacturing process.

In the case where the blade itself has a cleaning-liquid ejecting function as in the related art technology described above, the cleaning liquid can be ejected relatively uniformly and to appropriate positions over a wide range of the windshield. However, because the blade normally moves in a substantially circular pattern in a state where there is always a substantial amount of cleaning liquid in front of the blade in the moving direction thereof, the cleaning liquid tends to splatter outward in the radial direction of the moving region of the blade due to the effect of a centrifugal force generated as a result of the movement of the blade.

In particular, with regard to a blade (i.e., a second blade) having a moving region that includes a region below an upper mid region of the windshield, the cleaning liquid may become pushed out to the upper mid region of the windshield as the second blade moves. Then, the cleaning liquid pushed out to the upper mid region of the windshield can no longer be wiped off with the second blade.

Thus, until a blade (i.e., a first blade) with a moving region that includes the upper mid region of the windshield performs subsequent wiping operation, the cleaning liquid remains in the upper mid region. For ensuring good forward visibility, this state in which the cleaning liquid remains in the upper mid region of the windshield is not preferred since the cleaning liquid may subsequently drip downward.

Furthermore, in recent years, some vehicles are equipped with a function that captures an image of the conditions ahead and assists in driving based on the captured data. In such vehicles, since an image capturing device, such as a camera, is disposed in the upper mid region of the windshield, the state where the cleaning liquid remains therein may adversely affect the function of the image capturing device.

FIG. 6 illustrates a problem in a vehicle having image capturing devices, such as cameras, disposed in the upper mid region of a windshield 100. Specifically, FIG. 6 illustrates how a cleaning liquid 26 splattering from a reciprocating second blade 14 in the radial direction thereof (indicated by an arrow 220) enters a specific region 18 on the windshield 100, which is a region corresponding to the field angle of image capturing devices 16-1 and 16-2. In this state in which the cleaning liquid 26 remains in the specific region 18, the function of the image capturing devices 16-1 and 16-2 is adversely affected.

Therefore, in a blade having a cleaning-liquid ejecting function, there is a challenge to prevent the cleaning liquid from remaining in the upper mid region of the windshield as much as possible.

SUMMARY OF THE INVENTION

In view of the challenge mentioned above, an object of the present invention is to provide a vehicle wiper device equipped with a blade having a cleaning-liquid ejector, in which the vehicle wiper device can effectively prevent a cleaning liquid from remaining in an upper mid region of a windshield.

In order to achieve the aforementioned object, an aspect of the present invention provides a vehicle wiper device including a first blade having an operating range that includes an upper mid region of a vehicle windshield; a second blade having an operating range that includes a lower region of the operating range of the first blade; a blade driving unit that causes each blade to reciprocate within the corresponding operating range on the windshield; and a controller that controls operation of the blade driving unit. When a tip end of the second blade moves in a special control region that is disposed within an area of the reciprocation and that is oriented toward a specific region preliminarily specified region of the upper mid region, the controller controls the blade driving unit such that a moving speed of the second blade is lower than a moving speed of the second blade when moving in another region.

The specific region may be a region at least including a field-angle range of the image capturing device in a vehicle equipped with the vehicle wiper device, the vehicle having an image capturing device disposed in an upper region at an inner side of the windshield facing an interior of a vehicle cabin.

The first blade and the second blade may each have an ejector that ejects a cleaning liquid and a cleaning-liquid feeder that feeds the cleaning liquid to the ejector and causes the ejector to eject the cleaning liquid. Control in the special control region performed by the controller may include controlling the cleaning-liquid feeder such that an ejection amount of the cleaning liquid in the special control region is smaller than an ejection amount of the cleaning liquid in another region.

The special control region may be set such that the special control region is shifted downward as a vehicle speed increases.

BRIEF DESCRIPTION OF THE DRAWINGS

FIGS. 4A to 4C illustrate the operation of the second blade of the vehicle wiper device in FIG. 1 when the vehicle is traveling at high speed;

FIGS. 5A to 5C illustrate the operation of the second blade of the vehicle wiper device in FIG. 1 when the vehicle is traveling at low speed.

DETAILED DESCRIPTION

A vehicle wiper device according to an example of the present invention will be described in detail below with reference to the drawings.

Figure 1:
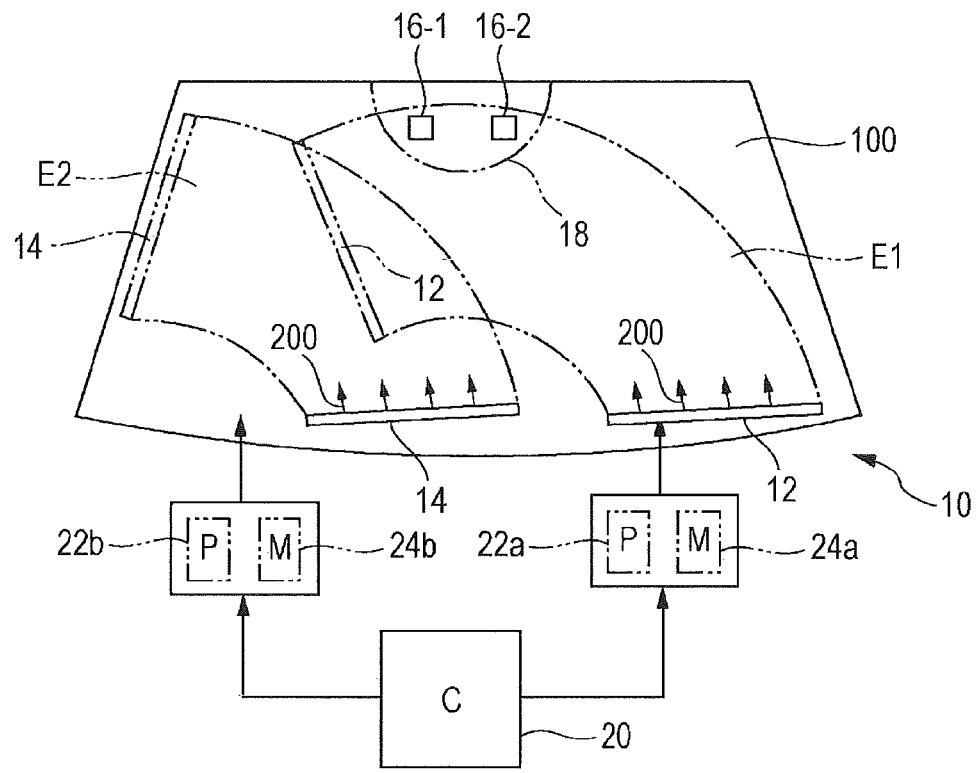
FIG. 1 is a schematic configuration diagram of a vehicle wiper device according to an example of the present invention.

FIG. 1 is a schematic configuration diagram of a vehicle wiper device 10 according to an example of the present invention and illustrates a front windshield 100 of a vehicle with a right-hand steering wheel, as viewed from the outside. As illustrated in FIG. 1, on the windshield 100, a first blade 12 is provided at the passenger-seat side, which is the right side in FIG. 1, and a second blade 14 is provided at the driver-seat side, which is the left side. Although the left and right sides are inverted in the case of a vehicle with a left-hand steering wheel, a description thereof will be omitted below.

Each of the blades 12 and 14 is attached to an end of a pivot arm (not illustrated) and pivots back and forth within a predetermined range in accordance with operation of the pivot arm. An operating-area E1 of the first blade 12 includes an upper mid region of the windshield 100, and an operating area E2 of the second blade 14 includes a region below the upper mid region of the windshield 100. The operating area E1 and the operating area E2 partially overlap each other.

A pair of cameras 16-1 and 16-2 as image capturing devices that are used for checking the conditions ahead is disposed at the inner side of the windshield 100. A region 18 corresponds to a field angle that is a photographic range of the cameras 16-1 and 16-2. Hereinafter, the region 18 is referred to as "the specific region 18". Based on image information acquired with these cameras 16, the presence of, for instance, an object ahead and the distance thereto are detected and determined, such that control for assisting in driving of the vehicle is performed.

Furthermore, in the vehicle wiper device 10 according to this example, each of the blades 12 and 14 has a cleaning-liquid ejector (not illustrated) that ejects a cleaning liquid in a direction indicated by arrows 200 in FIG. 1. The cleaning liquid is ejected by causing ejection pumps 22a and 22b controlled by a controller 20 to feed the cleaning liquid to the blades 12 and 14. In one example, a cleaning-liquid feeding unit may refer to the overall configuration that includes the ejection pumps 22a and 22b and that feeds the cleaning liquid retained in a cleaning-liquid tank (not illustrated) to the cleaning-liquid ejectors of the blades 12 and 14.

The pivot operation of the pivot arms (not illustrated) that bring the aforementioned blades 12 and 14 into operation is performed by drive motors 24a and 24b similarly controlled by the controller 20. Specifically, with regard to each of the blades 12 and 14, the pivot operation thereof is independently controlled, and the ejection of the cleaning liquid is also independently performed. In one example, a blade driving unit may refer to the overall configuration that includes the drive motors 24a and 24b and that makes the pivot arms pivot.

For instance, by individually changing the outputs of the drive motors 24a and 24b, the operating speeds of the blades 12 and 14 can be controlled. Moreover, by individually changing the pressures of the ejection pumps 22a and 22b, the cleaning-liquid ejection amounts can be adjusted.

The controller 20 includes a central processing unit (CPU), a read-only memory (ROM), and so on and is capable of independently or synchronously controlling the first blade 12 and the second blade 14, as described above.

Figure 2:
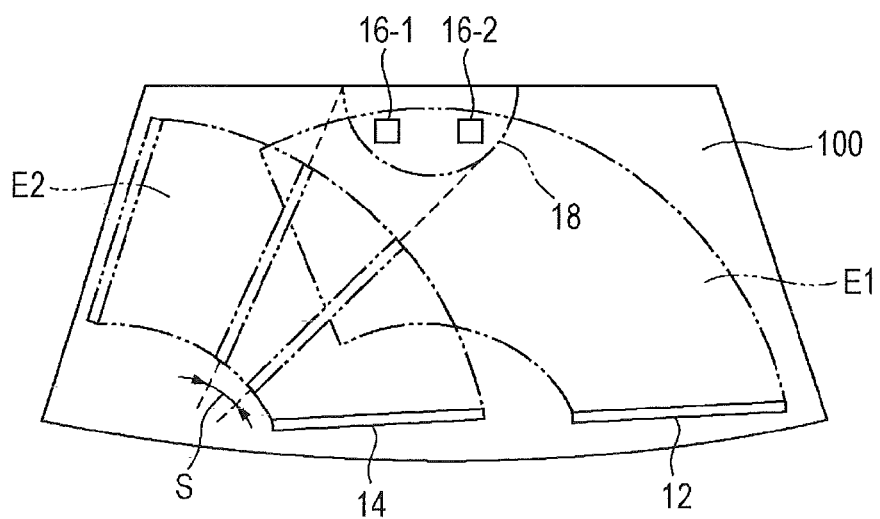
FIG. 2 illustrates a special control region in the vehicle wiper device in FIG. 1.

FIG. 2 illustrates a special control region S of the second blade 14 in FIG. 1. As described above, the specific region 18 is a region corresponding to the field-angle range of the image capturing devices 16-1 and 16-2 in the vehicle having image capturing devices disposed in an upper region at the inner side of the windshield 100 facing the interior of the vehicle cabin. In the operating area E2, a region in which the tip end of the second blade 14 is oriented toward the above-mentioned specific region 18 serves as the special control region S where control is performed differently from the remaining regions.

Specifically, when the second blade 14 passes the special control region S, the controller 20 controls the output of the drive motor 24b and the pressure of the ejection pump 22b. Although this control does not always have to be performed with respect to both the motor output and the pump pressure, this example will be described with reference to a case where the control is simultaneously performed with respect to both the motor output and the pump pressure.

Figures 3A, 3B, 3C:
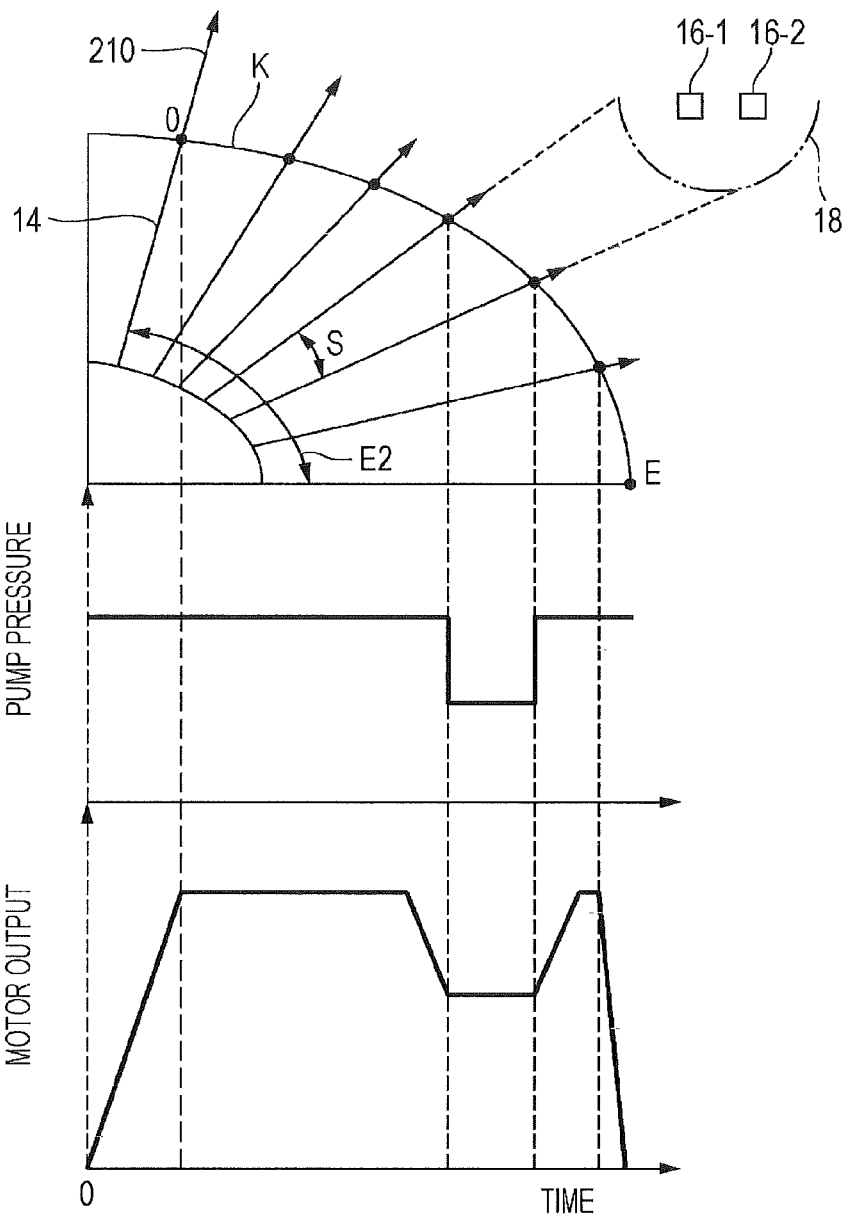
FIGS. 3A to 3C illustrate the operation of a second blade of the vehicle wiper device in FIG. 1 when the vehicle is traveling at intermediate speed.

FIGS. 3A to 3C illustrate the operation of the second blade 14 when the vehicle speed is at about an intermediate level (intermediate speed). First, in the operating area E2, the second blade 14 operates in a forward motion by moving upward from the lower side of the windshield 100, which corresponds to a pre-driven state, to a topmost point, and then returns from that point (i.e., a top reversal point) as a start point O to an end point E, which is a bottom reversal point. In FIG. 3A, the lines illustrated in the operating area E2 express the positions of the second blade 14 at predetermined time intervals. The trajectory of the tip end of the second blade 14 is expressed with a curve line denoted by a reference character K. Each of arrows 210 protruding from the trajectory K of the tip end of the second blade 14 denotes a vector that expresses the moving direction of the cleaning liquid and the moving force thereof. The direction of each arrow indicates the moving direction of the cleaning liquid, and the length of each arrow indicates the moving force applied to the cleaning liquid.

Specifically, when the cleaning liquid is ejected, a portion of the cleaning liquid is splattered on the windshield 100 in the radial direction of the reciprocating second blade 14. The moving direction of the cleaning liquid splattered in the radial direction is determined by a vector sum of inertial force of the splattered cleaning liquid, gravity, and vehicle-wind-speed lifting force. The inertial force of the cleaning liquid is proportional to the moving speed of the second blade 14, and the vehicle-wind-speed lifting force is proportional to the vehicle speed.

In the intermediate vehicle speed condition illustrated in FIG. 3A, it is assumed that the cleaning liquid splattered in the radial direction continues to flow in the radial direction without changing the angle.

Since the splattered cleaning liquid continues to flow in the radial direction, the cleaning liquid splattered in the radial direction by the second blade 14 in the special control region S flows into the specific region 18. As illustrated in FIG. 3B, when the second blade 14 moves in the special control region S, the controller 20 performs control to reduce the ejected cleaning liquid by decreasing the pressure of the ejection pump 22b. Furthermore, as illustrated in FIG. 3C, when the second blade 14 moves in the special control region S, the controller 20 performs control to reduce the moving speed by decreasing the output of the drive motor 24b. By reducing the moving speed, the centrifugal force applied to the cleaning liquid by the second blade 14 moving in the special control region S can be weakened. In FIGS. 3B and 3C, the abscissa axis indicates time.

By performing the control described above, when the second blade 14 moves in the special control region S, the speed of the second blade 14 is reduced so that the cleaning-liquid ejection amount is reduced. Thus, due to this reduction of the operating speed and this reduction of the cleaning-liquid ejection amount, there is hardly any cleaning liquid splattered in the radial direction from the tip end of the second blade 14. Consequently, an adverse effect on the function of the image capturing devices caused by the cleaning liquid remaining within the specific region 18 is favorably prevented.

Although the case where the second blade 14 moves in a returning motion is described by priority, similar control may also be suitably performed when the second blade 14 moves in a forward motion. However, in the case of the forward motion, since the first blade 12 performs wiping immediately behind the second blade 14, the time in which the cleaning liquid remains is short. Therefore, performing the above-described control during the returning motion is more effective. The same applies to the operation described below with reference to FIGS. 4A to 5C.

FIGS. 4A to 4C illustrate control operation performed when the vehicle is traveling at high speed. Specifically, the operation of the second blade 14 when the cleaning liquid is splattered in the radial direction to the upper region of the front windshield 100 will be described.

As illustrated in FIG. 4A, with regard to the cleaning liquid splattered in the radial direction, a vector sum of inertial force of the splattered cleaning liquid, gravity, and vehicle-wind-speed lifting force is oriented more upward than that illustrated in FIG. 3A. This is because the vehicle-wind-speed lifting force is larger. Therefore, the cleaning liquid splattered in the radial direction enters the specific region 18 immediately before the second blade 14 returns to the end point E. Thus, the special control region S is shifted downward relative to that in FIG. 3A, and the pressure of the ejection pump 22b and the output of the drive motor 24b are controlled. FIGS. 4B and 4C illustrate how this control is performed.

When the second blade 14 moves in the special control region S that has been shifted downward relative to that in FIG. 3A, the controller 20 controls the pressure of the ejection pump 22b and the output of the drive motor 24b. Specifically, similar to the case of FIGS. 3A to 3C, when the second blade 14 moves in the special control region S, the pressure of the ejection pump 22b is decreased, and the output of the drive motor 24b is decreased. By performing the control in this manner, the cleaning liquid splattered in the radial direction from the tip end of the second blade 14 may be appropriately prevented from being scattered or pushed outward in the radial direction, as in the case illustrated in FIGS. 3A to 3C. Consequently, an adverse effect on the function of the image capturing devices caused by the cleaning liquid remaining within the specific region 18 is favorably prevented.

Figure 5A:
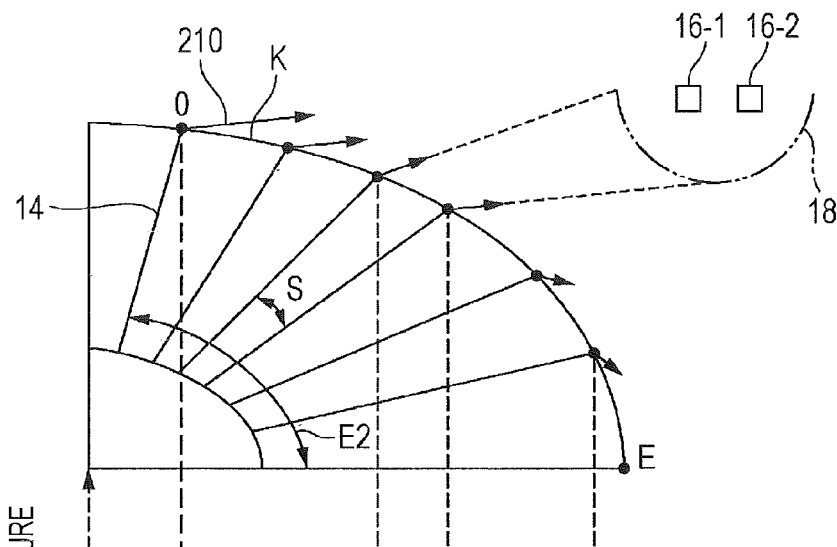
Figure 5B:
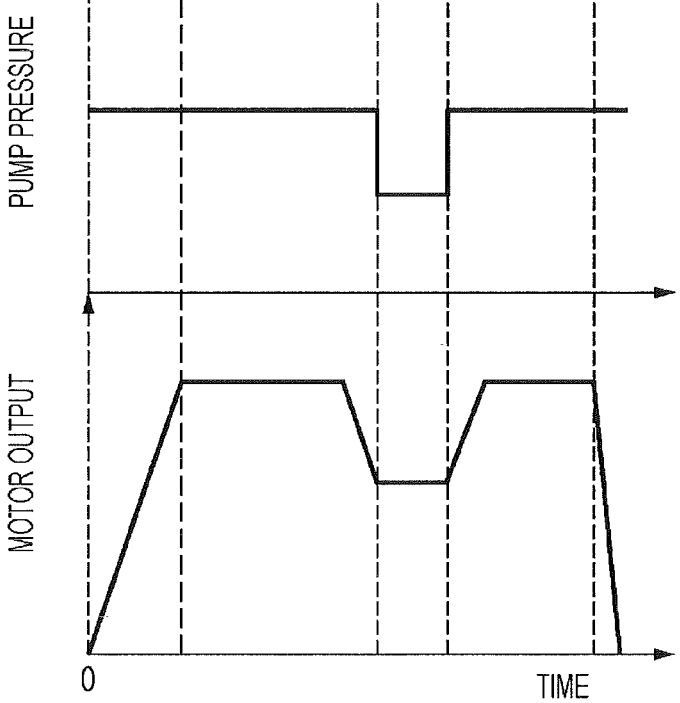
Figure 6:
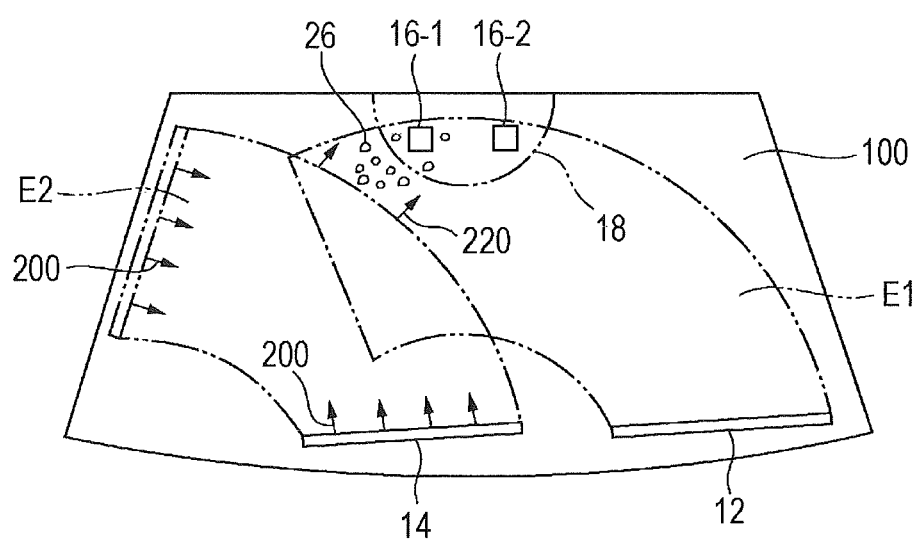
FIG. 6 illustrates a problem in a vehicle having image capturing devices, such as cameras, disposed in an upper mid region of a windshield.

FIGS. 5A to 5C illustrate control operation performed when the vehicle is traveling at low speed. Specifically, the following description relates to a case where the cleaning liquid splattered in the radial direction is splattered substantially sideways toward the passenger-seat side on the front windshield 100. As illustrated in FIG. 5A, with regard to the cleaning liquid splattered in the radial direction by the second blade 14, a vector sum of inertial force of the splattered cleaning liquid, gravity, and vehicle-wind-speed lifting force is oriented sideways toward the passenger-seat side. This is because the effect of gravity is larger than the vehicle-wind-speed lifting force. Therefore, when the second blade 14 returns from the start point O toward the end point E, which is the accommodation position, the cleaning liquid splattered in the radial direction may possibly enter the specific region 18 at an earlier stage.

Thus, the special control region S is shifted upward relative to that in FIG. 3A, and the pressure of the ejection pump 22b and the output of the drive motor 24b are controlled. FIGS. 5B and 5C illustrate a state where the control for suppressing the motor output and the pump pressure is shifted upward. By performing the control in this manner, an adverse effect on the function of the image capturing devices caused by the cleaning liquid remaining within the specific region 18 is favorably prevented, as in the case illustrated in FIGS. 3A to 3C.

In the vehicle wiper device according to this example, when the second blade 14 passes the special control region S, the controller 20 performs control to decrease the output of the drive motor 24b that drives the second blade 14 and also to reduce the cleaning-liquid ejection amount by decreasing the pressure of the cleaning-liquid ejection pump 22b. Therefore, the cleaning liquid can be appropriately prevented from being scattered or pushed outward, in the radial direction when the second blade 14 moves in the special control region S, and the cleaning liquid is effectively prevented from remaining in the specific region 18, which corresponds to the field angle of the image capturing devices, of the windshield 100, thereby ensuring good forward visibility of the vehicle.

The present invention is not limited to the scope described in the above-described example, and various modifications are possible within the scope of the invention. First, as described above, the effect of the control of the moving speed of the blade and the control of the cleaning-liquid ejection amount can be similarly exhibited by performing either one of the two types of control. Moreover, although the vehicle speed is described by being divided into three levels, namely, low speed, intermediate speed, and high speed, the control range may be suitably shifted in accordance with specific numerical speed values. Furthermore, the degrees by which the moving speed and the pump pressure are controlled in the control operation may be varied in accordance with the vehicle speed instead of being uniform.

Furthermore, although the above example is directed to a configuration in which the blades are equipped with the ejectors, the above example may alternatively be applied to a vehicle equipped with ejectors at locations other than the blades.

The invention claimed is:

1. A vehicle wiper device comprising:
   a first blade having an operating range that includes an upper mid region of a vehicle windshield;

a second blade having an operating range that includes a lower region of the operating range of the first blade;
a blade driving unit that causes each blade to reciprocate within a corresponding operating range on the windshield; and
a controller that controls an operation of the blade driving unit,
wherein when a tip end of the second blade moves in a special control region that is disposed within an area of a reciprocation and that is oriented toward a specific region preliminarily specified in the upper mid region, the controller controls the blade driving unit such that a moving speed of the second blade is lower than a moving speed of the second blade when moving in another region, and
the specific region is a region at least including a field-angle range of an image capturing device in a vehicle equipped with the vehicle wiper device, the vehicle having an image capturing device disposed in an upper region at an inner side of the windshield facing an interior of a vehicle cabin.

2. The vehicle wiper device according to claim 1,
wherein a control in the special control region performed by the controller includes controlling a cleaning-liquid feeder such that an ejection amount of a cleaning liquid in the special control region is smaller than an ejection amount of the cleaning liquid in another region.

3. The vehicle wiper device according to claim 2,
wherein the special control region is set such that the special control region is shifted downward as a vehicle speed increases.

4. The vehicle wiper device according to claim 1,
wherein the special control region is set such that the special control region is shifted downward as a vehicle speed increases.

5. A vehicle wiper device comprising:
a first blade having an operating range that includes an upper mid region of a vehicle windshield;
a second blade having an operating range that includes a lower region of the operating range of the first blade;
a blade driving unit that causes each blade to reciprocate within a corresponding operating range on the windshield; and
a controller that controls an operation of the blade driving unit,
wherein the first blade and the second blade each have an ejector that ejects a cleaning liquid and a cleaning-liquid feeder that feeds the cleaning liquid to the ejector and causes the ejector to eject the cleaning liquid, and
wherein when a tip end of the second blade moves in a special control region that is disposed within an area of a reciprocation and that is oriented toward a specific region preliminarily specified in the upper mid region, the controller controls the blade driving unit such that a moving speed of the second blade is lower than a moving speed of the second blade when moving in another region, and
the specific region is a region at least including a field-angle range of an image capturing device in a vehicle equipped with the vehicle wiper device, the vehicle having the image capturing device disposed in an upper region at an inner side of the windshield facing an interior of a vehicle cabin.

6. The vehicle wiper device according to claim 5,
wherein a control in the special control region performed by the controller includes controlling the cleaning-liquid feeder such that an ejection amount of the cleaning liquid in the special control region is smaller than an ejection amount of the cleaning liquid in another region.

7. The vehicle wiper device according to claim 6,
wherein the special control region is set such that the special control region is shifted downward as a vehicle speed increases.

8. The vehicle wiper device according to claim 5,
wherein the special control region is set such that the special control region is shifted downward as a vehicle speed increases.

* * * * *